US009871445B2

(12) United States Patent
Schmitz

(10) Patent No.: US 9,871,445 B2
(45) Date of Patent: Jan. 16, 2018

(54) POWER CONVERTER WITH EFFICIENCY CALCULATION

(71) Applicant: IDT EUROPE GMBH, Dresden (DE)

(72) Inventor: Richard Maria Schmitz, San Tan Valley, AZ (US)

(73) Assignee: IDT EUROPE GMBH, Dresden (DE)

( * ) Notice: Subject to any disclaimer, the term of this patent is extended or adjusted under 35 U.S.C. 154(b) by 0 days.

(21) Appl. No.: 15/029,104

(22) PCT Filed: Oct. 15, 2014

(86) PCT No.: PCT/EP2014/072095
§ 371 (c)(1),
(2) Date: Apr. 13, 2016

(87) PCT Pub. No.: WO2015/055704
PCT Pub. Date: Apr. 23, 2015

(65) Prior Publication Data
US 2016/0254748 A1    Sep. 1, 2016

Related U.S. Application Data

(60) Provisional application No. 61/890,974, filed on Oct. 15, 2013.

(51) Int. Cl.
*H02M 3/156* (2006.01)
*H02M 3/158* (2006.01)
*H02M 3/157* (2006.01)

(52) U.S. Cl.
CPC ........... *H02M 3/158* (2013.01); *H02M 3/156* (2013.01); *H02M 3/157* (2013.01)

(58) Field of Classification Search
CPC . H02M 2001/0009; H02M 2001/0022; H02M 2001/0048; H02M 3/156; H02M 3/158; H02M 3/1588
See application file for complete search history.

(56) References Cited

U.S. PATENT DOCUMENTS 7,701,189 B2 * 4/2010 Gehrke ............... H02M 3/1588
                                                          323/283
8,278,895 B2 * 10/2012 Gardner ............... H02M 3/156
                                                          323/282
(Continued)

FOREIGN PATENT DOCUMENTS

DE    10 2008 044662 A1    3/2010
DE    10 2012 221670 A1    5/2014

OTHER PUBLICATIONS

International Search Report for International Application No. PCT/EP2014/072095, dated Jan. 27, 2015.

*Primary Examiner* — Gary L Laxton
(74) *Attorney, Agent, or Firm* — Heslin Rothenberg Farley & Mesiti P.C.

(57) ABSTRACT

A switched power converter includes a power stage. The power stage includes a sensor for sensing an output current to obtain a sensed output current, a sensor for sensing an output voltage to obtain a sensed output voltage, and a sensor for sensing an input voltage to obtain a sensed input voltage. The power converter further includes a look-up table or mathematical relationship implementation for deriving an efficiency measure of the power converter from the sensed input voltage, the sensed output voltage and the sensed output current by relating an energy taken by a load and an energy delivered by the input voltage for a specific period of time.

14 Claims, 2 Drawing Sheets

(56) References Cited

U.S. PATENT DOCUMENTS 8,941,366 B2 * 1/2015 Halsted ................ H02M 3/155
 323/271
2011/0309811 A1 12/2011 Kondo et al.

* cited by examiner

POWER CONVERTER WITH EFFICIENCY CALCULATION

CROSS REFERENCE TO RELATED APPLICATIONS

This application is a national stage filing under section 371 of International Application No. PCT/EP2014/072095, filed on Oct. 15, 2014, and published in English on Apr. 23, 2015, as WO 2015/055704 A1 and claims priority of U.S. Provisional application no. 61/890,974 filed on Oct. 15, 2013, the entire disclosure of these applications being hereby incorporated herein by reference.

FIELD OF THE INVENTION

The present disclosure relates to a power converter with efficiency calculation and related method.

BACKGROUND OF THE INVENTION

Usually efficiency for power converters is reported through measurements of typical operating points for input voltage Vin, output voltage Vout and output current Iout. For any static operating point this method is well suited to calculate the efficiency.

Unfortunately in real life operation the operating conditions vary significantly and in most of the cases are unpredictable. Therefore an easy calculation of the efficiency of a switched mode power management controller is not possible with a calculation assuming static behavior.

With the trend in today's power management controllers to incorporate telemetry functions an on-chip calculation of the real world efficiency is highly desirable.

DISCLOSURE OF THE INVENTION

It is an objective of the present invention to provide a reliable efficiency determination of a power converter for varying operating conditions.

The present invention relates to a switched power converter comprising a power stage for generating an output voltage according to a switching signal and an input voltage by means of a switching element. The power stage comprises means for sensing an output current to obtain a sensed output current, means for sensing an output voltage to obtain a sensed output voltage, means for sensing an input voltage to obtain a sensed input voltage. The power converter further comprising means for deriving an efficiency measure of the power converter from a sensed input voltage, a sensed output voltage and a sensed output current by relating an energy taken by a load and an energy delivered by the input voltage for a specific period of time.

The means for deriving an efficiency measure may be configured to compute a ratio of energy taken by a load and the energy delivered by the input voltage and wherein the efficiency measure is defined by the ratio, specifically according to the following formula:

$$eta(T) = \frac{\int_0^T Vout(t)Iout(t)dt}{\int_0^T Vin(t)Iin(t)dt},$$

wherein eta(T) is an efficiency measure for the specific period of time. Vout(t)Iout(t) is the output power and can be determined from the sensed output voltage Vout(t) and the sensed output current Iout(t) at time t. Vin(t)Iin(t) is the input power that may be determined from the sensed input voltage Vin(t) and the input current Iin(t). This then allows for a real efficiency calculation over time.

The input current Iin(t) can be determined using a lookup table or pre-computed mathematical relationship that maps the output voltage Vout(t), output current Iout(t) and the input voltage Vin(t) to a value for the input current Iin(t) for time t.

Therefore, the means for deriving an efficiency measure may be configured to determine the energy taken by the load by integrating an output power Vout(t)Iout(t) computed from the sensed output voltage Vout(t) and output current Iout(t) for the specific period of time T and to determine the energy delivered by the input voltage by integrating the input power Vin(t)Iin(t) computed from the sensed input voltage Vin(t) and the determined input current Iin(t) for the specific period of time T.

Alternatively, the input current Iin(t) may be measured. Therefore, the power converter may comprise means for sensing the input current.

The pre-computed mathematical relationship or lookup table may be designed to directly map the output voltage Vout(t), the output current Iout(t) and the input voltage Vin(t) to the input power.

Therefore, the means for deriving an efficiency measure may be configured to determine the energy taken by the load by integrating an output power computed from the sensed output voltage and sensed output current for the specific period of time and to determine the energy delivered by the input voltage by integrating the input power determined from the pre-computed mathematical relationship or the lookup table for the specific period of time.

The lookup table or pre-computed mathematical relationship may be derived by measurements during the development phase for different power stages, thus prior to operating the power converter. The measurements comprise a plurality of combinations of input voltage, output voltage and output current to map each of the plurality of combinations to an input current or input power.

The present invention further relates to a method for operating a switched power converter. The method comprises sensing an output current to obtain a sensed output current; sensing an output voltage to obtain a sensed output voltage; sensing an input voltage to obtain a sensed input voltage; deriving an efficiency measure of the power converter from a sensed input voltage, a sensed output voltage and a sensed output current by relating an energy taken by a load and an energy delivered by the input voltage for a specific period of time.

The method may comprise providing a lookup table or a pre-computed mathematical relationship mapping input voltage, output voltage and output current to an input power; using the lookup table or pre-computed mathematical relationship to determine an input power from the sensed output current; sensed output voltage and sensed input voltage. Deriving an efficiency measure of the power converter may then comprise determining the energy taken by the load by integrating an output power computed from the sensed output voltage and sensed output current for the specific period of time and determining the energy delivered by the input voltage by integrating the input power for the specific period of time.

Alternatively, the method may comprise providing a lookup table or a pre-computed mathematical relationship mapping input voltage, output voltage and output current to an input current; and using the lookup table or pre-computed mathematical relationship to determine an input current from the sensed output current; sensed output voltage and sensed input voltage. Deriving an efficiency measure of the power converter may then comprise determining the energy taken by the load by integrating an output power computed from the sensed output voltage and sensed output current for the specific period of time and determining the energy delivered by the input voltage by integrating the input power computed from the sensed input voltage and the determined input current for the specific period of time.

Alternatively, the method may comprise sensing an input current to obtain a sensed input current. Deriving an efficiency measure of the power converter may then comprise determining the energy taken by the load by integrating an output power computed from the sensed output voltage and sensed output current for the specific period of time and determining the energy delivered by the input voltage by integrating the input power computed from the sensed input voltage and the sensed input current for the specific period of time.

BRIEF DESCRIPTION OF THE DRAWINGS

Reference will be made to the accompanying drawings, wherein.

DETAILED DESCRIPTION OF THE INVENTION

Figure 1:
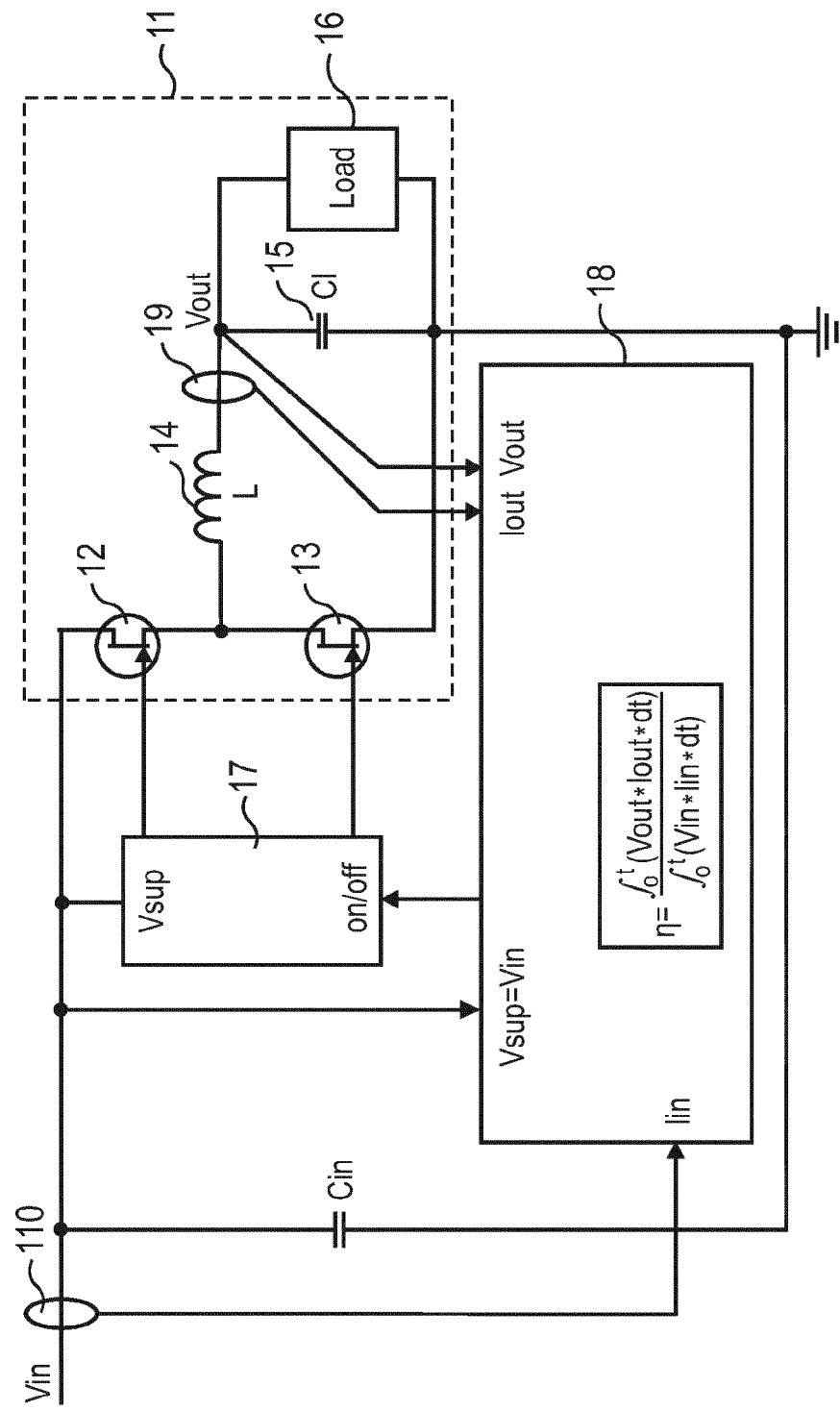
FIG. 1 shows a block diagram of a DC-DC converter deriving an efficiency measure from sensed input current, input voltage, output current and output voltage.

FIG. 1 shows an embodiment of a power converter being controlled by a controller comprising a power stage 11. The power stage 11 comprises a first switching element 12 and a second switching element 13, an inductance 14 and a capacitor 15. The switching elements 12 and 13 are driven by a driver 17 with zero current detection. The driver 17 generates a switching signal according to a control law. In a charge phase the capacitor 15 is charged via the inductor 14. In a discharge phase the capacitor 15 is discharged via load 16.

It is desirable to determine an efficiency measure of the power converter during operation. The efficiency measure can be derived from input voltage, output voltage and output current and further input current.

For this purpose, the power converter comprises means for sensing an output current 19 to obtain a sensed output current Iout, means for sensing an output voltage to obtain a sensed output voltage Vout, means for sensing an input voltage to obtain a sensed input voltage Vin and further means for sensing an input current 110 to obtain a sensed input current.

The power converter further comprising means for deriving an efficiency measure of the power converter 18 from a sensed input voltage, a sensed output voltage, a sensed output current and a sensed input current. The means for deriving an efficiency measure comprise means for computing an energy delivered by the sensed input voltage and the sensed input current and an energy taken from the sensed output power and sensed output current as shown by the formula (1).

Figure 2:
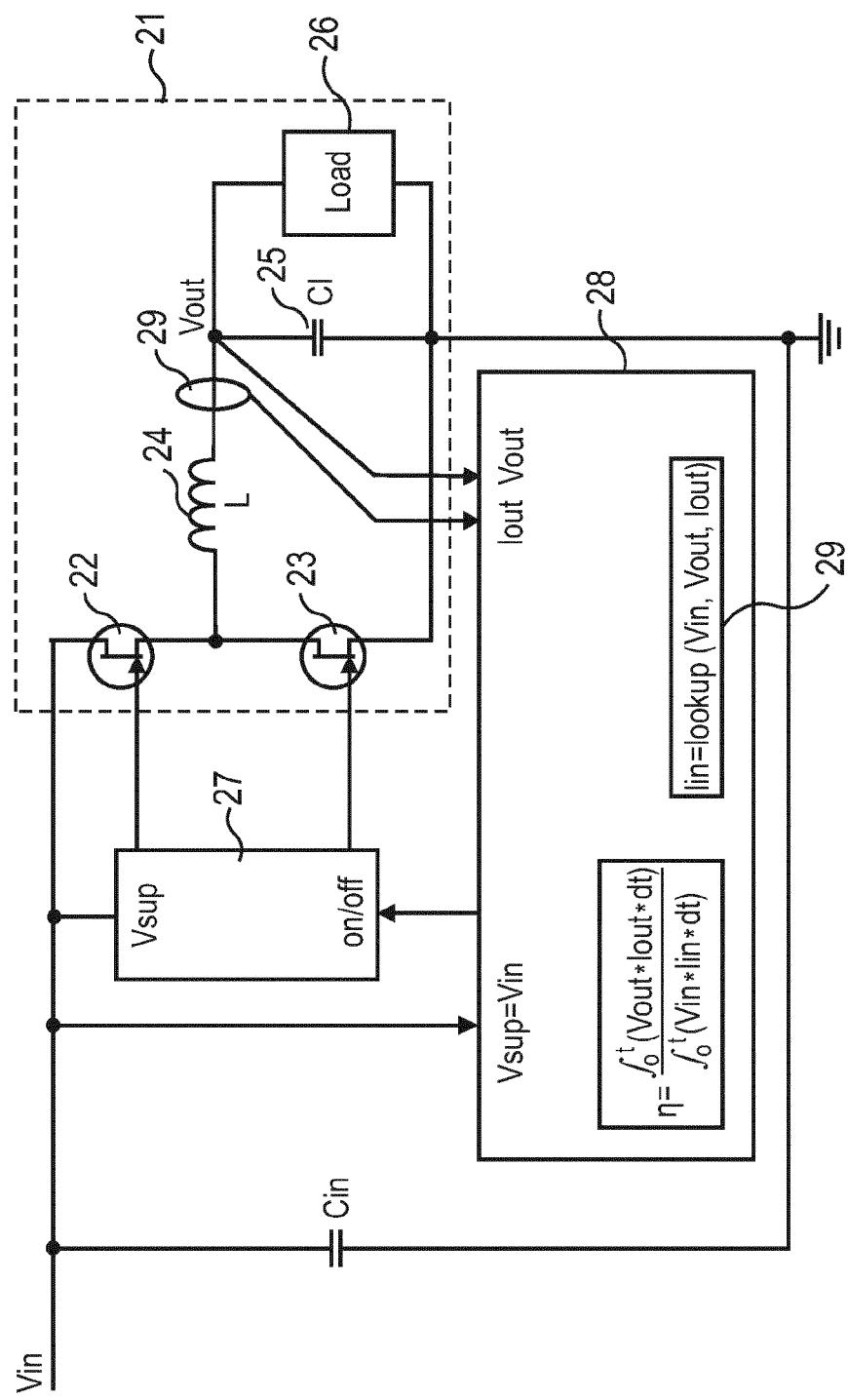
FIG. 2 shows a block diagram of a DC-DC converter deriving an efficiency measure from sensed input voltage, output current, output voltage and an input current derived from an a-priori know mathematical relationship.

In an alternative embodiment as shown in FIG. 2 the input current is not measured but instead derived from sensed input voltage, sensed output voltage and sensed output current. Therefore the power converter comprises means for deriving the input current. Said means for deriving an input current may comprise a lookup table 29 storing a plurality of input current values, each of the plurality of efficiency values corresponding to a specific realization of input voltage, output voltage and output current. The lookup table for deriving an input current may be obtained from measurements prior to operating the switched power converter.

The invention claimed is:

1. A switched power converter comprising:
a power stage for generating an output voltage according to a switching signal and an input voltage by means of a switching element, the power stage comprising means for sensing an output current to obtain a sensed output current, means for sensing an output voltage to obtain a sensed output voltage, means for sensing an input voltage to obtain a sensed input voltage; the power converter further comprising means for deriving an efficiency measure of the power converter from the sensed input voltage, the sensed output voltage and the sensed output current by relating an energy taken by a load and an energy delivered by the input voltage for a specific period of time, wherein the means for deriving an efficiency measure comprise a lookup table storing a plurality of values for an input power or an input current, each of the plurality of values for an input power or an input current corresponding to a realizing of sensed input voltage, sensed output voltage and sensed output current and wherein the means for deriving an efficiency measure is configured;
to determine the energy taken by the load by integrating an output power computed from the sensed output voltage and sensed output current for the specific period of time, and
to determine the energy delivered by the input voltage by integrating the input power for the specific period of time.

2. The switched power converter according to claim 1, wherein:
the means for deriving an efficiency measure is further configured:
to determine the energy delivered by the input voltage by integrating the input power computed from the sensed input voltage and the determined input current for the specific period of time.

3. The switched power converter according to claim 2, wherein the lookup table is derived from measurements prior to operating the switched power converter, said measurements comprising a plurality of combinations of input voltage, output voltage and output current to map each of the plurality of combinations to a value for input power or input current.

4. The switched power converter according to claim 1, wherein the lookup table is derived from measurements prior to operating the switched power converter, said measurements comprising a plurality of combinations of input voltage, output voltage and output current to map each of the plurality of combinations to a value for input power or input current.

5. The switched power converter according to claim 1, wherein the means for deriving an efficiency measure is configured to compute a ratio of energy taken by a load and the energy delivered by the input voltage and wherein the efficiency measure is defined by the ratio.

6. A switched power converter comprising:
a power stage for generating an output voltage according to a switching signal and an input voltage by means of a switching element, the power stage comprising means for sensing an output current to obtain a sensed output current, means for sensing an output voltage to obtain a sensed output voltage, means for sensing an input voltage to obtain a sensed input voltage; the power converter further comprising means for deriving an efficiency measure of the power converter from the sensed input voltage, the sensed output voltage and the sensed output current by relating an energy taken by a load and an energy delivered by the input voltage for a specific period of time, wherein the means for deriving an efficiency measure comprise a pre-computed mathematical relationship relating sensed input voltage, sensed output voltage and sensed output current to a value for an input power or an input current; and wherein the means for deriving an efficiency measure is configured:
to determine the energy taken by the load by integrating an output power computed from the sensed output voltage and sensed output power or output current for the specific period of time, and
to determine the energy delivered by the input voltage by integrating the input power for the specific period of time.

7. The switched power converter according to claim 6, wherein the means for deriving an efficiency measure is further configured:
to determine the energy delivered by the input voltage by integrating the input power computed from the sensed input voltage and the determined input current for the specific period of time.

8. The switched power converter according to claim 7, wherein the pre-computed mathematical relationship is derived from measurements prior to operating the switched power converter, said measurements comprising a plurality of combinations of input voltage, output voltage and output current to map each of the plurality of combinations to a value for input power or input current.

9. The switched power converter according to claim 6, wherein the pre-computed mathematical relationship is derived from measurements prior to operating the switched power converter, said measurements comprising a plurality of combinations of input voltage, output voltage and output current to map each of the plurality of combinations to a value for input power or input current.

10. The switched power converter according to claim 6, wherein the means for deriving an efficiency measure is configured to compute a ratio of energy taken by a load and the energy delivered by the input voltage and wherein the efficiency measure is defined by the ratio.

11. A method for operating a switched power converter, said method comprising:
sensing an output current to obtain a sensed output current;
sensing an output voltage to obtain a sensed output voltage;
sensing an input voltage to obtain a sensed input voltage;
deriving an efficiency measure of the power converter from the sensed input voltage, the sensed output voltage and the sensed output current by relating an energy taken by a load and an energy delivered by the input voltage for a specific period of time, by providing a lookup table or a pre-computed mathematical relationship mapping input voltage, output voltage and output current to an input power; using the lookup table or pre-computed mathematical relationship to determine an input power from the sensed output current; sensed output voltage and sensed input voltage; and wherein deriving an efficiency measure of the power converter comprises:
determining the energy taken by the load by integrating an output power computed from the sensed output voltage and sensed output current for the specific period of time, and
determining the energy delivered by the input voltage by integrating the input power for specific period of time.

12. The method according to claim 11, wherein deriving an efficiency measure comprises computing a ratio of energy taken by a load and the energy delivered by the input voltage and wherein the efficiency measure is defined by the ratio.

13. The method according to claim 11, wherein the lookup table or pre-computed mathematical relationship is derived by measurements during a development phase for different power stages, thus prior to operating the power converter, and wherein the measurements comprise a plurality of combinations of input voltage, output voltage and output current to map each of the plurality of combinations to an input current or input power.

14. A method for operating a switched power converter, said method comprising:
sensing an output current to obtain a sensed output current;
sensing an output voltage to obtain a sensed output voltage;
sensing an input voltage to obtain a sensed input voltage;
deriving an efficiency measure of the power converter form the sensed input voltage, the sensed output voltage and the sensed output current by relating an energy taken by a load and an energy delivered by the input voltage for a specific period of time, by:
providing a lookup table or a pre-computed mathematical relationship mapping input voltage, output voltage and output current to an input current;
using the lookup table or pre-computed mathematical relationship to determine an input current from the sensed output current; sensed output voltage and sensed input voltage; and wherein deriving an efficiency measure of the power converter comprises:
determining the energy taken by the load by integrating an output power computed from the sensed output voltage and sensed output current for the specific period of time, and
determining the energy delivered by the input voltage by integrating the input power computed from the sensed input voltage and the determined input current for the specific period of time.

\* \* \* \* \*